United States Patent [19]

Ngo et al.

[11] Patent Number: 5,342,512
[45] Date of Patent: * Aug. 30, 1994

[54] FLOATING AQUATIC PLANT TREATMENT SYSTEM WITH POROUS SYSTEM

[75] Inventors: Viet H. Ngo, Minneapolis; Warren D. Poole, St. Paul; Sean J. Hancock, Eagan; Timothy T. France, Oakdale, all of Minn.

[73] Assignee: The Lemma Corporation, Mendota Heights, Minn.

[*] Notice: The portion of the term of this patent subsequent to Mar. 17, 2009 has been disclaimed.

[21] Appl. No.: 17,340

[22] Filed: Feb. 11, 1993

Related U.S. Application Data

[62] Division of Ser. No. 323,022, Mar. 17, 1989.

[51] Int. Cl.$^5$ .............................................. C02F 3/32
[52] U.S. Cl. .................................. 210/151; 210/170; 210/242.1; 405/52
[58] Field of Search .............. 210/602, 749, 150, 151, 210/170, 242.1, 242.2; 405/52; 47/59, 62, 63

[56] References Cited

U.S. PATENT DOCUMENTS

| | | | |
|---|---|---|---|
| 2,283,472 | 5/1942 | Tuxhorn | 119/3 |
| 3,155,609 | 11/1964 | Pampel | 210/3 |
| 3,385,786 | 5/1968 | Klock | 210/12 |
| 3,456,385 | 7/1969 | Plath | 47/1.2 |
| 3,653,192 | 4/1972 | Bryant | 56/1 |
| 3,760,946 | 9/1973 | Boler | 210/170 |
| 3,839,198 | 10/1974 | Shelef | 210/602 |
| 3,852,378 | 12/1974 | Guida | 210/242.2 |
| 3,911,514 | 10/1975 | Ito | 9/8 R |
| 3,927,491 | 12/1975 | Farnsworth | 47/1.2 |
| 3,959,923 | 6/1976 | Selke | 47/1.4 |
| 4,133,141 | 1/1979 | Lee | 47/59 |
| 4,169,050 | 9/1979 | Serfling et al. | 210/602 |
| 4,209,943 | 7/1980 | Moeller et al. | 47/59 |
| 4,320,594 | 3/1982 | Raymond | 47/59 |
| 4,324,067 | 4/1982 | Kessler | 47/59 |
| 4,333,263 | 6/1982 | Adey | 210/602 |
| 4,333,827 | 6/1982 | Plosz | 210/602 |
| 4,382,348 | 5/1983 | Kitsu et al. | 47/59 |
| 4,487,588 | 12/1984 | Lewis, III et al. | 47/59 |
| 4,536,988 | 8/1985 | Hogen | 47/59 |
| 4,738,563 | 4/1988 | Clark | 405/52 |
| 4,747,958 | 5/1988 | Eberhardt | 210/242.1 |
| 4,806,251 | 2/1989 | Durda | 210/170 |
| 4,872,985 | 10/1989 | Dinges | 210/747 |
| 5,011,604 | 4/1991 | Wilde et al. | 210/602 |

FOREIGN PATENT DOCUMENTS

| | | | |
|---|---|---|---|
| 241896 | 12/1964 | Australia. | |
| 277905 | 4/1990 | Fed. Rep. of Germany | 210/602 |
| 2239120 | 3/1975 | France. | |
| 2361060 | 8/1976 | France. | |
| 58-70893 | 4/1983 | Japan | 210/602 |
| 906455 | 2/1981 | U.S.S.R. | |
| 1373035 | 11/1974 | United Kingdom. | |

OTHER PUBLICATIONS

*Operations Forum*, vol. 4, Aug. 1987.
*Journal WPCF*, vol. 60, No. 7, Jul. 1988, 1253–1258.
*Concentrates Oil for Easier Recovery*, Megator Corporation.
*Mud Cat In Action*, National Car Rental System, Inc., Public Works, Dec. 1981.
*Aerated Lagoon Systems With Improved Performance*, Linvil G. Rich, Water/Engineering & Management, Feb. 1982.
*Bio–Separator*, Bisanco Inc.
*A Low–Cost Secondary Treatment Alternative*, Linvil G. Rich, WATER/Engineering & Management, Feb. 1982.

*Primary Examiner*—Thomas Wyse
*Attorney, Agent, or Firm*—Kinney & Lange

[57] ABSTRACT

A floating aquatic plant water treatment system (31) utilizes a serpentine channel (36) defined by dividing walls (34). Floating plants (72) are distributed across the water surface by a floating grid structure (32). The grid structure (32) is preassembled into Z-fold bundles (88) which are towed onto the water and unfolded. The treatment system uses sprayers (62) to control growth conditions. Porous baffles (46) are placed along portions of the channel (36) to provide intimate contact with a larger portion of the water while allowing free flow.

9 Claims, 13 Drawing Sheets

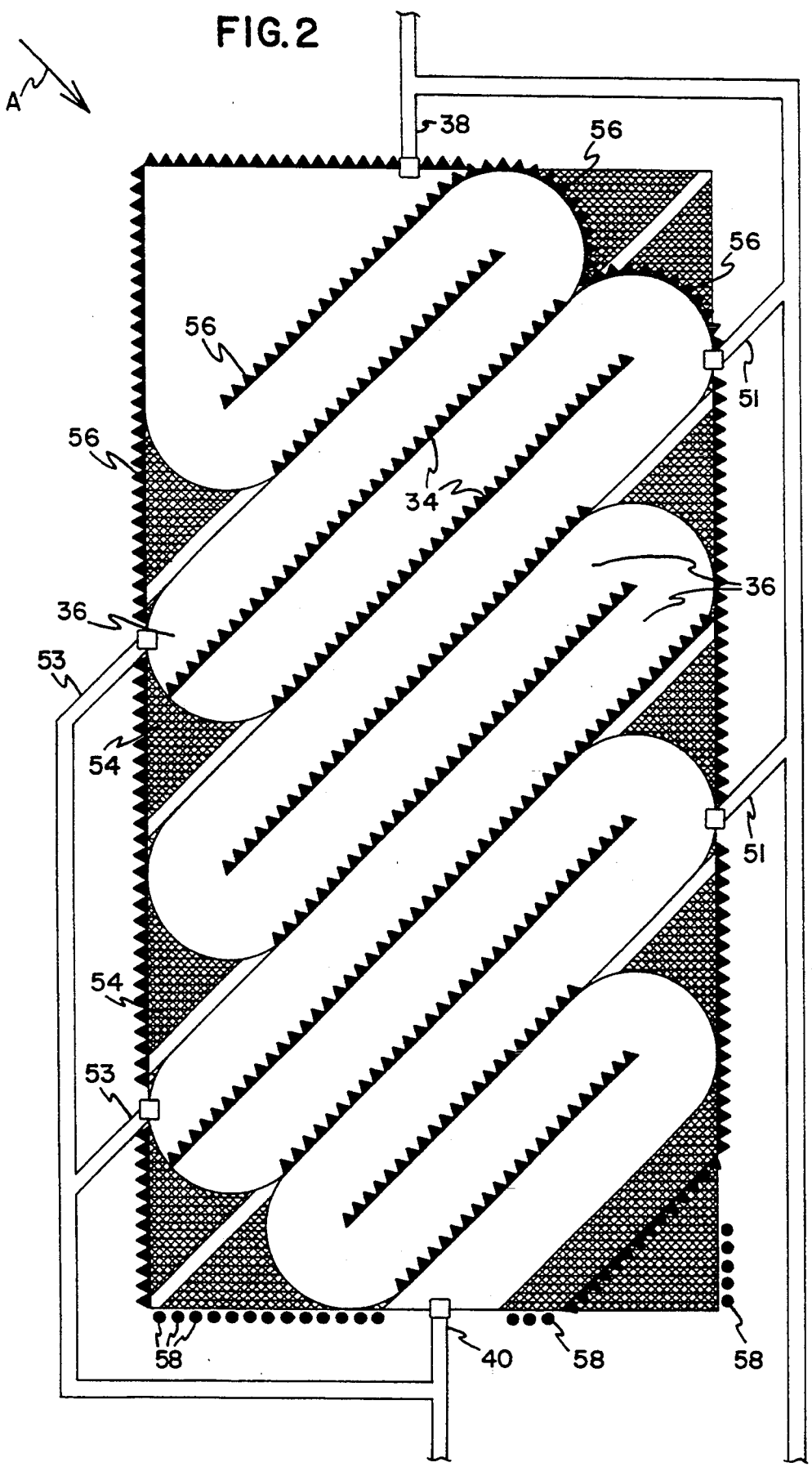

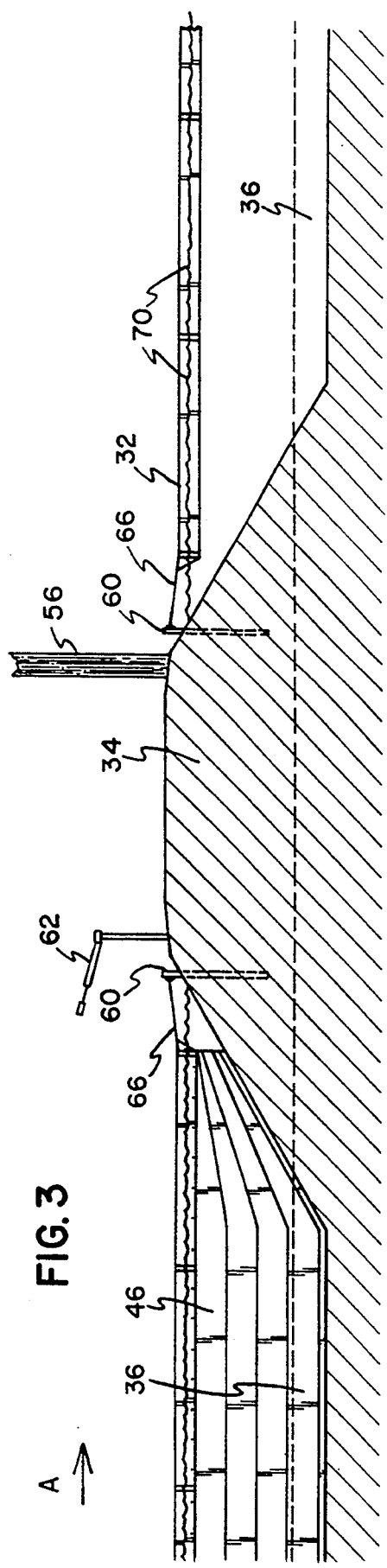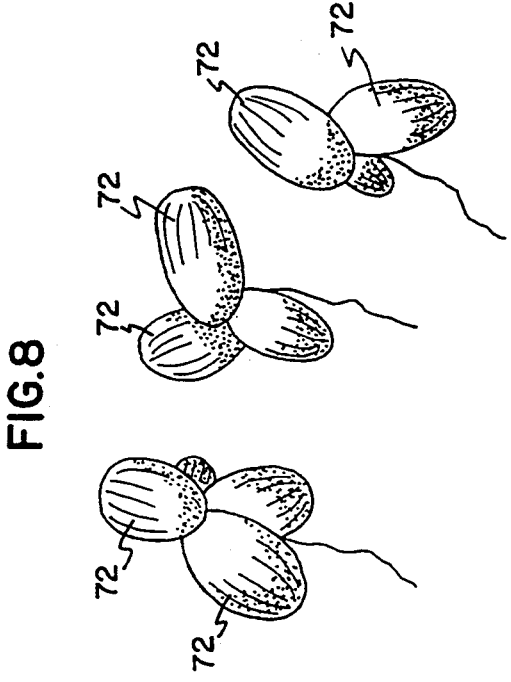

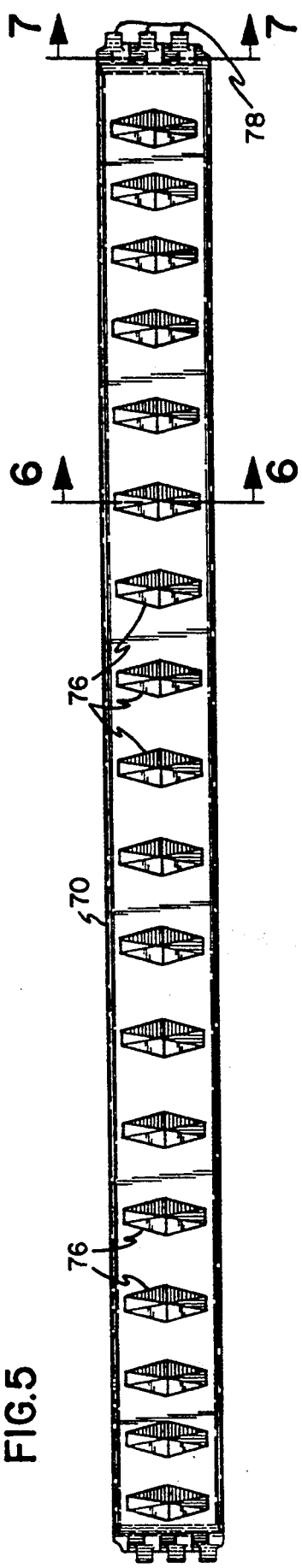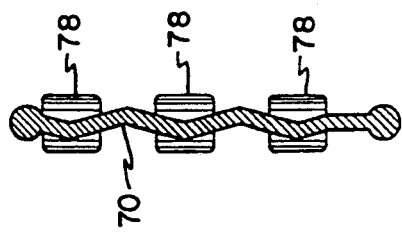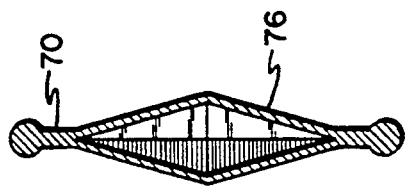

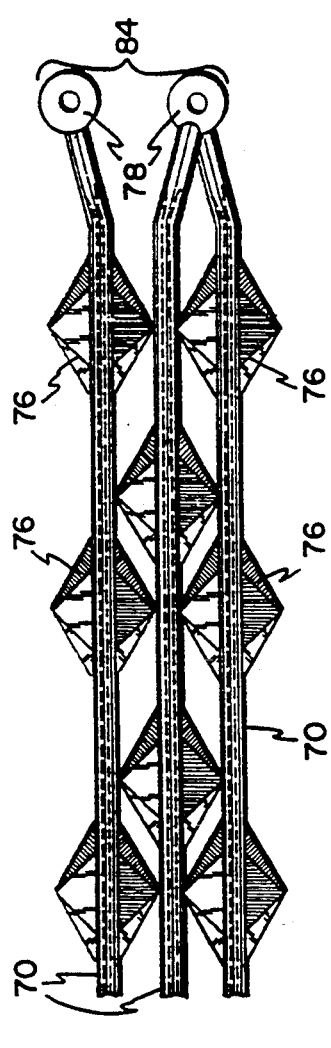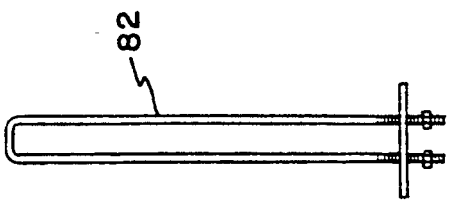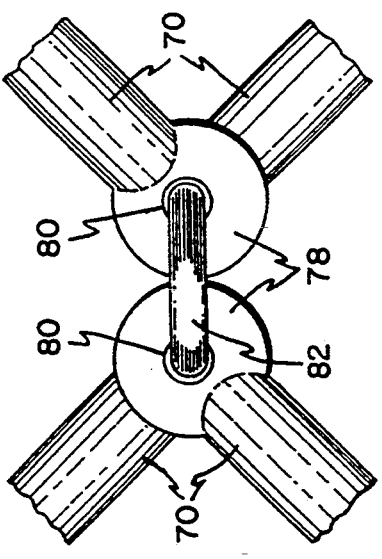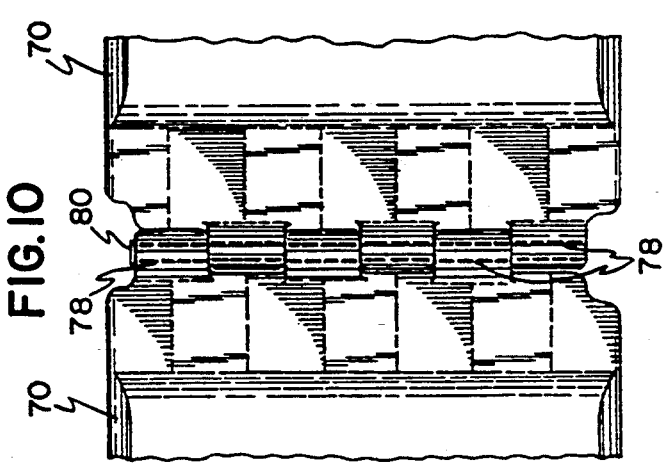

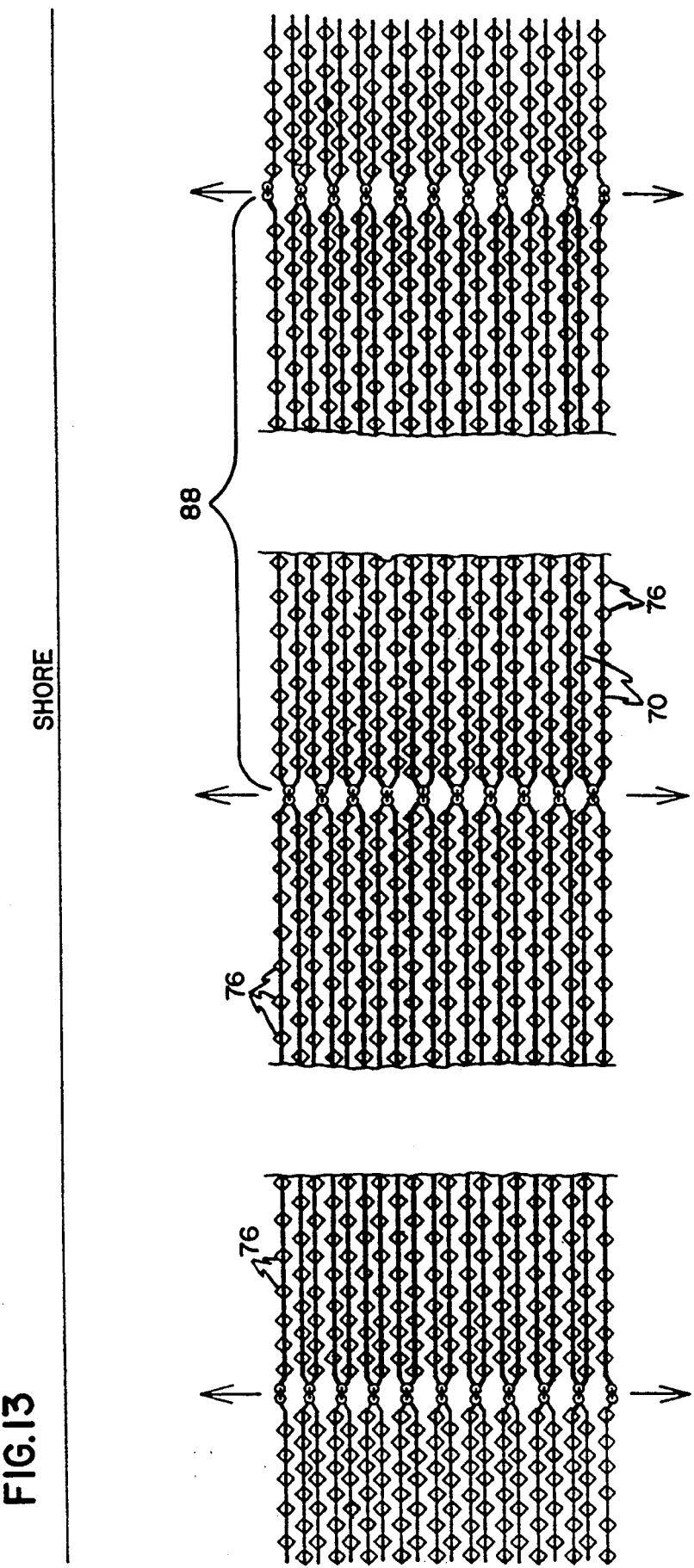

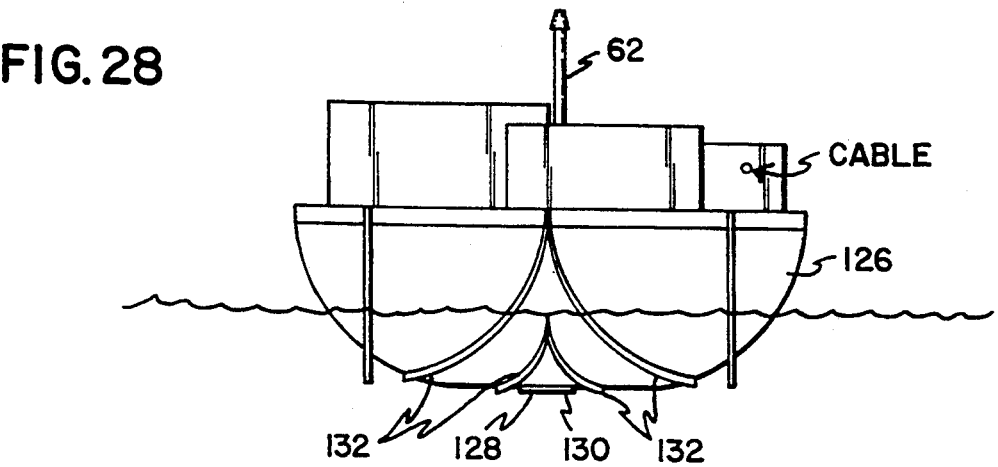
FIG. 28
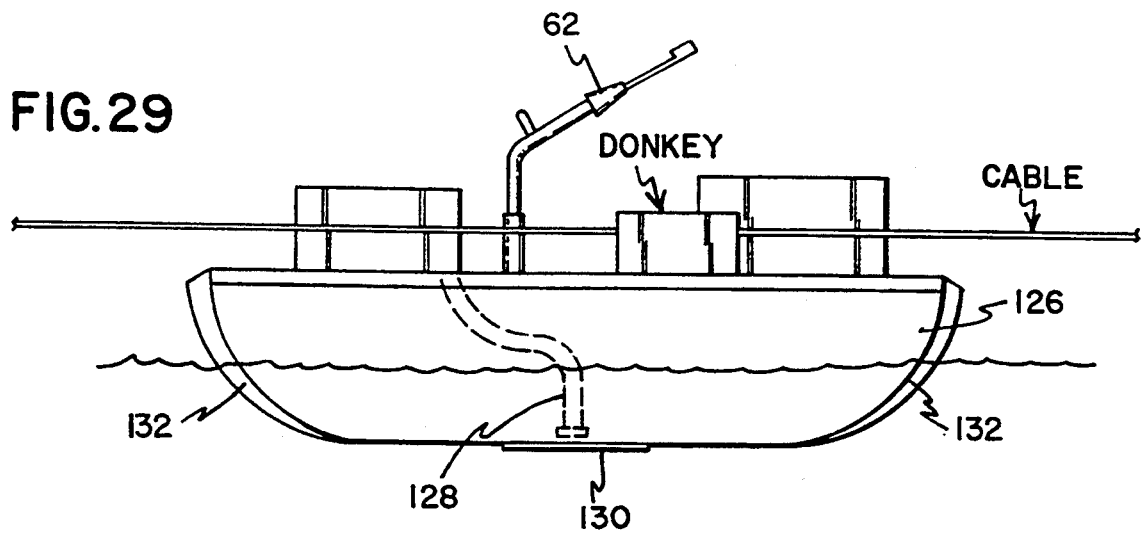
FIG. 29
FIG. 27
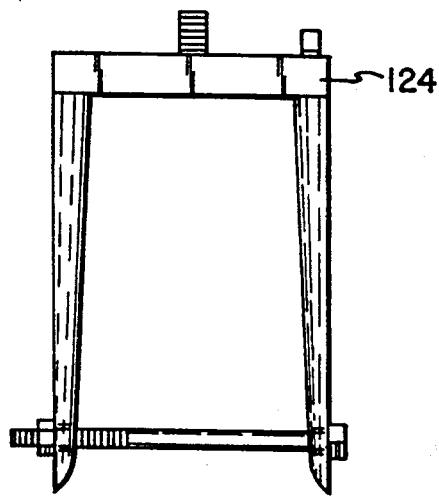
FIG. 26
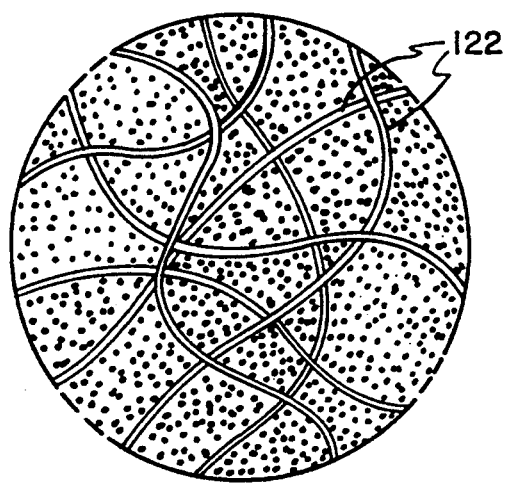

FLOATING AQUATIC PLANT TREATMENT SYSTEM WITH POROUS SYSTEM

This is a divisional application of application Ser. No. 07/323,022, filed Mar. 17, 1989.

BACKGROUND OF THE INVENTION

The present invention relates to a biomass producing system and in particular to a wastewater treatment system using floating aquatic plants for removing pollutants as the water passes through the treatment system. Floating aquatic plants have been used in the treatment of wastewater and/or for improved water quality. For example, plants of the duckweed and liverwort families, water hyacinths, water chestnuts, water lettuce, heartleaf, hydrillas, and azollas have proven effective for water treatment. The duckweed family of plants provides for a biomass producing system wherein unwanted nutrients are harvested from aquatic systems by means of bioaccumulation to treat wastewater and/or improve water quality, and the plants are harvested as a cash crop. Duckweed is particularly suited to this purpose as it is native to most of the world including the United States and has the capability of rapidly taking up nutrients from an aquatic environment to provide a food source with a high nutritional and protein content. The natural development of these plants has produced strains which can grow throughout the year given an open water condition. In addition, these plants have developed a pest resistance which is missing in most other cash crops. Natural resistance to pests provides for a nearly pesticide-free and herbicide-free operation.

The use of small ponds to reduce the fetch, or linear measure of area that the wind acts on to create waves, such that the wave action is minimized, has not proven to be an effective or cost effective means of utilizing the duckweed in wastewater treatment. It has become necessary to provide containment systems for controlling the coverage of the duckweed plants. The use of a containment system also limits the fetch and reduces wave action. Such a system is disclosed in U.S. Pat. No. 4,536,988 to Hogen, dated Aug. 27; 1985 and assigned to the Lemna Corporation. The Hogen patent discloses a containment system for floating aquatic plants. The Hogen system has inherent problems in deployment, in properly containing the Lemna plants, and in withstanding a range of environmental conditions. The Hogen patent also is somewhat difficult to maintain and repair and is not well adapted for differing sizes and shapes of water areas.

An efficient channeling system for containing such a containment system has not been developed. A floating grid system which is easily deployed and easy to maintain is not yet available. Controlling the water temperature and removing dust particles and other harmful debris from the plants has also been proven to be a problem as well as bringing the waste water into contact the floating aquatic plants or treatment organisms and flora.

The present invention solves these and other problems related to using floating aquatic plants and with treatment of wastewater and enabling harvesting as a cash crop, economically.

SUMMARY OF THE INVENTION

The present invention relates to a system for treatment of wastewater and improved water quality by use of floating aquatic plants.

According to the present invention, a dividing wall, preferably a berm, is used to channel the wastewater along a winding path wherein pollutants are removed. Berms are constructed so that the material removed from the channel and placed on the berms is of approximately equal volume. In this manner, little material is required to be hauled in or away from the wastewater treatment area. The channel is constructed having parallel straight portions connected by U-turns. The channel is constructed such that the flow is between turbulent and laminar flow regimes. The channel is also constructed so that the straight portions are perpendicular to the direction of the prevailing wind, thereby reducing the wind fetch, and maximizing the use of berms as a wind break. The U-turns may have a curvilinear guide to aid in directing the flow of water around the turn and onto the next straight portion to decrease wearing at the turn. In a preferred embodiment, the berms will have trees or shrubs planted thereon as a windbreak.

The wastewater treatment channel is preferably constructed in modules so that a portion of the channel may be constructed and used before the remainder of the channel. In this manner where time is important on a construction schedule, a wastewater treatment system can be implemented much faster. Furthermore the winding configuration provides for use of control structures along the channel so that the water may enter or exit the system along an intermediate portion of the channel should the entire channel length not be required.

Preferably the channel includes an access so that a harvester or barge may be launched onto the water and retrieved. The winding channel configuration is especially advantageous when combined with a grid containment system for containing duckweed plants used in wastewater treatment. The channel may also include baffles extending across the channel to further advantage, as explained hereinafter.

The channel structure is especially effective when combined with a grid system for containing floating aquatic plants used in treating wastewater. The floating containment grid structure is constructed of individual grid sections which are reversible and float on the surface of the water. The grid sections include flotation chambers so that the grid sections are buoyant and extend above the water to a height sufficient to contain the floating aquatic plants. The grid segments may have any length, but are preferably of the same length for a given body of water for interchanging, so that the segments may be easily replaced. The reversibility allows the segments to be flipped upside down should the exposed portion of a flotation chamber be damaged.

The individual grid sections are connected at the end portions which are bent slightly from the longitudinal direction of the grid section so that they may be connected to the adjacent grid section having an end portion bent toward the first grid section. A hollow connecting tube is inserted into holes in meshing fingers of the end portions so that a hinged connection is made when the hollow tube is inserted. The slightly bent end portions allow the grid sections to be folded against one another in a parallel arrangement. The floating chambers are preferably staggered so that they do not impinge on floating chambers of the adjacent grid sections. With this construction, a multiplicity of grid sections may be connected to form a Z-fold bundle for transporting to a deployment site.

The unique structure in the Z-fold connections allows for easy deployment of the grid sections to form a containment grid. The grid sections are preferably connected to form a Z-fold bundle which, when unfolded and deployed, extends the width of the body of water. When the Z-fold bundles have been transported to the shore of the body of water, the Z-fold bundles are connected at the hinges to adjacent Z-fold bundles by inserting a U-bolt through the hollow connecting tubes at the hinged portions of the Z-fold bundles. The connected Z-fold bundles are then towed across the body of water with additional Z-fold bundles being added as required until the Z-fold bundles extend the length of the body of water. The Z-fold bundles are unfolded down the length of a channel and anchored to the shore. Additional Z-fold bundles are added and unfolded until the channel portion is covered by the grid structure and ready for containment of floating aquatic plants.

The grid structure remains buoyant so that the floating aquatic plants are contained, but has the flexibility so that if a harvester is floated across the water surface, the grid may be depressed under the water's surface so that the aquatic plants may be harvested.

It is advantageous to use a sprayer system in conjunction with floating aquatic plants for increased productivity. Spraying water onto the plants helps control temperatures for optimum performance. In hot climates, cooler water from the bottom of the channel may be sprayed on the top portion to keep temperatures down. In very cold temperatures, water may be sprayed on the surface to prevent ice from forming and to provide heat to the floating aquatic plants. A further advantage in spraying over the floating plants is the cleaning of dust and debris from the plant surfaces. Nutrients may be added to the spray water and sprayed over the plants. This significantly reduces the amount of nutrients needed because the entire water column does not have to be injected with these nutrients.

According to the present invention, sprayers may be mounted in a number of configurations to insure complete coverage of the water's surface. Sprayers may be mounted on the berms so that the spray direction is out over the water. The sprayers are preferably mounted so that the spray pattern covers a substantial portion of the water's surface. In a second embodiment, sprayers may be mounted onto the floating containment grid. Spray nozzles are clipped onto the grid section connections with mounting brackets and may be placed so that a rotation of 360° is possible for complete coverage of the water.

Sprayers are also mounted on a watercraft so that the surface area is sprayed as the watercraft proceeds down the channel. The watercraft travels up and down the channel and covers the surface area with a spray pattern. When the sprayers are mounted on the watercraft, the water may be drawn directly from the water body. Care should be taken at the intake to insure that floating aquatic plants or other debris are not drawn into the sprayer, causing possible clogging in the sprayer system. To prevent pluggage and to aid harvesting, the harvester is equipped with fins to direct the floating aquatic plants away from an intake. The intake is fitted with a cover screen which prevents the plants from entering the sprayer system.

The present invention provides an economical and environmentally harmless system for treating wastewater with floating aquatic plants and providing a cash crop. The invention allows floating aquatic plants be used on a large scale commercial basis to reduce nutrient loading, trace metals, suspended solids, etc., and to treat wastewater effluents and for a variety of other water quality problems.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings wherein like reference numerals and letters indicate corresponding elements throughout the several views:

FIG. 2 is a view of the wastewater treatment system shown in FIG. 1 wherein trees are planted around the system;

FIG. 3 is a cross section of a channel in the treatment system shown in FIG. 1 showing sections of two straight portions of the channel and a separating berm;

FIG. 5 is a side view of a grid segment shown in FIG. 4;

FIG. 6 is a cross-sectional view of a flotation chamber of the grid segment taken along line 6—6 in FIG. 5;

FIG. 7 is a cross-sectional view of an end portion of the grid segment taken along line 7—7 in FIG. 5;

FIG. 8 hows a detail of Lemna plants;

FIG. 9 is a top view of the grid segments shown in FIG. 5 connected to adjacent grid segments in a "Z-fold" fashion to form a "Z-fold";

FIG. 10 is a side view showing a detail of meshing finger portions of connected grid segments shown in FIG. 5;

FIG. 11 is a top view of a detail of the meshing finger portions of four grid segments in a hinged connection to the adjacent hinged connection by a U-bolt;

FIG. 12 is a view of the U-bolt used in connecting the Z-fold bundles as shown in FIG. 11;

FIG. 13 is a top view of the Z-fold bundles connected to adjacent Z-fold bundles in a closely folded position;

FIG. 26 shows a detail of the fibrous baffle material;

FIG. 27 shows a sprayer mounting bracket for clipping to the grid system;

FIG. 28 shows a front view of barge or harvester vehicle; and

FIG. 29 shows a side view of the vehicle of FIG. 28.

DETAILED DESCRIPTION OF A PREFERRED EMBODIMENT

Containment Impoundment

Figure 1:
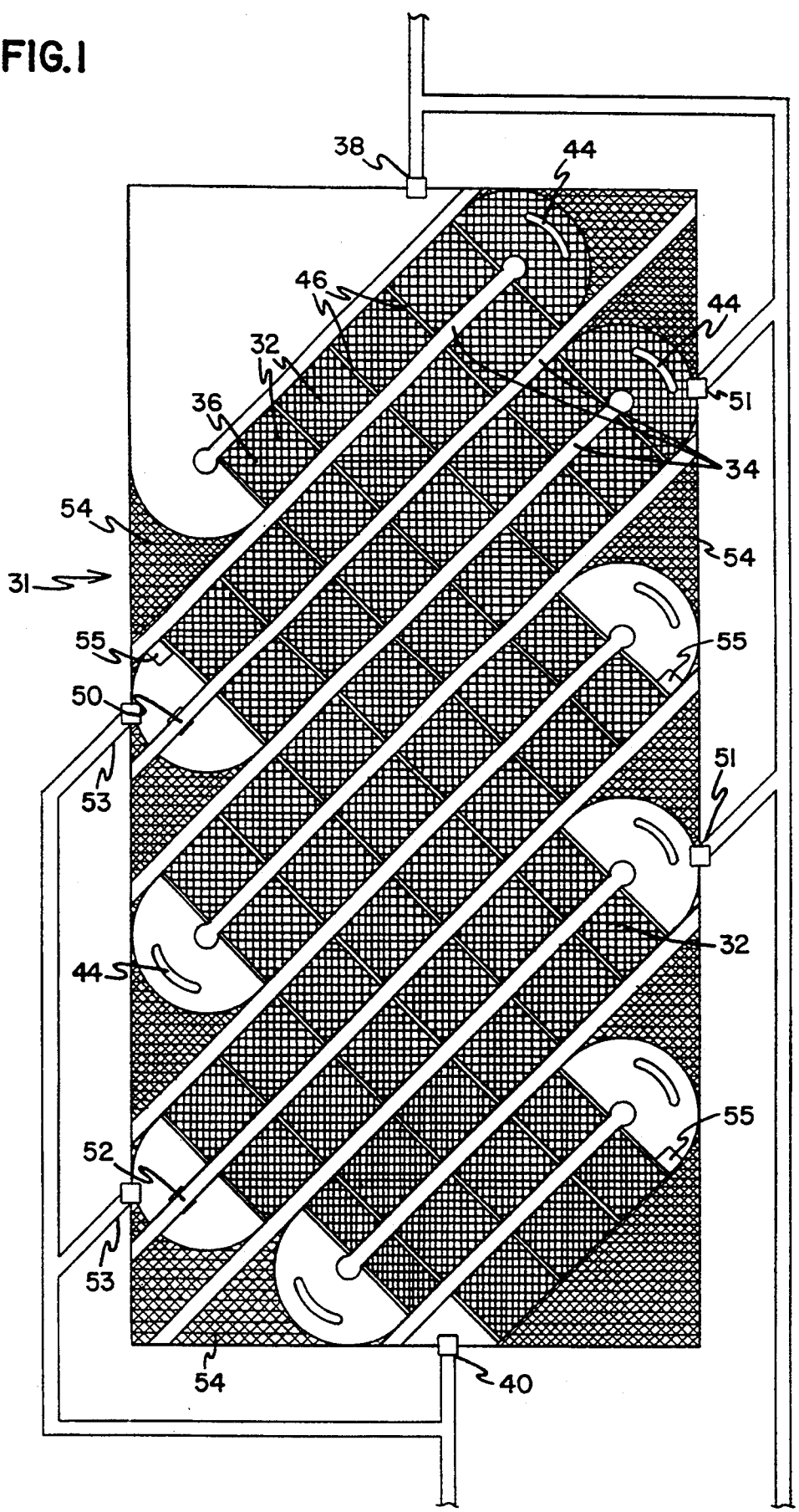
FIG. 1 is an overall view of an embodiment of a floating aquatic plant wastewater treatment system wherein an aquatic plant containment grid is deployed according to the principles of the present invention.

A preferred embodiment of a containment system used in wastewater treatment systems in conjunction with floating aquatic plants is shown generally at 31 in FIG. 1. A winding channel 36 is formed by dividing walls 34 constructed out of earth or other suitable materials, for directing water along a winding flow path. Water enters at an inlet 38, flows through the serpentine channel 36 and is treated before leaving at exit 40. The channel 36 winds back and forth along a substantially rectangular area so that the distance travelled by the water in a small area is increased. The channel 36 is constructed so that the water flows very slowly, thereby increasing treatment time. The flow is in the transition between the laminar and turbulent regimes. This induces good mixing in the water column for maximum contact of the pollutants with the floating aquatic plants. The presence of a dense mat of floating aquatic plants and a floating grid creates a quiescent water surface so that no riprapping is required, decreasing construction costs.

The turns have curvilinear outside shapes to prevent stagnation zones in the channels 36. Midstream curvilinear guides 44 may also be included to aid in flow direction of the water and eliminating water stagnation zones.

The system preferably includes a grid structure 32 floating on the water's surface for containing floating aquatic plants. The floating plants in the grid structure 32 create an environment that eliminates harmful waste from the water as explained hereinafter. The system further includes porous baffles 46 extending transversely of the wastewater flow for controlling water flow and providing sites for flora such as bacteria to aid in water treatment. If such a system is used, the channel 36 is preferably constructed so that launch ramps 55 are provided for placing a harvester or watering craft onto the channel 36.

As shown in FIG. 2, the channel 36 is constructed so that the water surface remains as calm as possible so the floating plants are evenly distributed. To achieve this condition, the straight portions of the channel 36 are constructed in a direction perpendicular to the prevailing direction of the wind as shown by arrow A. Furthermore, in the case where the dividing walls 34 are earthen berms, trees 56 and shrubbery 58 may be planted along the periphery of the treatment system and along the downwind side of berms 34 to decrease the wind velocity. In the preferred embodiment, the berms 34 have sprayers 62 and the trees 56 near the water's edge so that vehicles may be driven along the top of the berms 34.

Other economies can be achieved by construction methods wherein the material removed from the channel 36 is equal to the material added to the berms 34 and biomass harvest areas 54 near the turns. As shown in FIG. 3, the normal level of the ground before construction, as indicated by the dashed line, is such that the material added above the line to the berms 34 and the biomass harvest areas 54 surrounding the channel is equal to that removed below the dashed line from the channel 36. A major problem in creating most water treatment impoundments is the need for removal of material from the site or the addition of material for special berm construction. With the serpentine channel 36 and the floating grid system 32 of the present invention, special riprapping materials are not required and do not need to be hauled to the site. The lower grade construction materials used results in greater economies than has been possible with prior water treatment impoundments.

In the preferred embodiment, the channel is constructed so that the water flow is characterized by a Reynolds number between 2,000 and 5,000, and therefore in the transition between laminar and turbulent flow. The Reynolds number, R, is defined by the formula: $R = Vh/v$ where 'h' is the height of the water column, 'V' is the velocity of the water flow, and 'v' is the viscosity.

As can be further shown in FIG. 3, the berms 34 may include a sprayer system including the sprayer 62 mounted on the berms 34. In this manner, the conditions can be controlled for better growth of the floating aquatic plants for removal of pollutants from the water. The special pattern of the serpentine channels 36 with parallel straight sections provides for complete spraying coverage of the water's surface by placing the sprayers 62 on the berms 34. The straight sections also provide for substantially complete coverage of the water's surface with the containment grids 32 as shown in FIG. 1 without special shapes being required to cover the water's surface. The straight sections provide for easier deployment of the containment grid 32. In the preferred embodiment, the straight portions of the channel 36 are constructed such that the length to width ratio is no greater than 10:1 and no less than 3:1.

As further shown in FIG. 1, the present invention further provides construction economies by providing for modular construction and/or operation. Hydraulic control structures 50 and 52, such as valves or gates, provide for construction of a first portion of the treatment system and operation of that first portion independently of the remaining portion. The control structures 50 and 52 may be a pipe or passage including control valves or gates under the berms 34. During a second phase of construction an additional portion is constructed up to the control structure 52. This allows use of the further portion of the channel 36. And finally, a third portion of the channel 36 may be constructed and fully utilized. The use of control structures 50 and 52 in conjunction with alternative inlets 51 and alternative outlets 53 allows any portion of the system to be used independently of the other portions. In the system shown in FIG. 1, there are two alternative inlets 51 and two alternative outlets 53 for 3 modules. The alternative inlets 51 and outlets 53 can also be a pipe or passage under the berm 34 with control valves or gates similar to control structures 50 and 52. Several modules provide for greater flexibility in the conditions used for water treatment. This also allows the remaining modules to be repaired or closed off without significantly affecting the entire system. The modular construction and operation is not possible with other water treatment systems. Each modular portion preferably includes launch ramps 55 for putting a watercraft on the water in each portion.

The biomass harvest areas 54 located at the ends of the straight channels near the turns, provide areas for storing harvested aquatic plants from the treatment system. The harvested plants may be placed in the biomass harvest areas 54 and dried before removal for other uses. The biomass can also be spread thin on the harvest areas 54 as a soil amendment, therefore eliminating the need to transport if off-site.

Floating Grid Structure

In systems using floating aquatic plants in wastewater treatment, the floating plants should be maintained so that a substantial portion of the water's surface is covered and to maximize the surface contact between the plants and the water for better growth and reproduction. Furthermore, in the preferred embodiment, the plants can be harvested from time to time so that the correct coverage of plants is maintained for efficient wastewater treatment. If the plants are left free to float, wind blows the plants to one edge of the water's surface and the coverage is not evenly distributed for improved treatment conditions. Therefore the grid system 32 is implemented to contain the floating plants and provide a substantially even distribution upon the water's surface. As shown in FIG. 1, the grid system 32 covers a large portion of the channel 36 along the straight portions and may be deployed to cover the turns, or a portion thereof. As shown in FIG. 8, a typical plant may be the Lemna plant 72, commonly referred to as duckweed, which floats on the surface of the water and is readily adaptable to a variety of conditions. The Lemna plant 72 is also efficient in treating pollutants in the water and has characteristics that make it feasible for harvesting as a cash crop.

Figure 4:
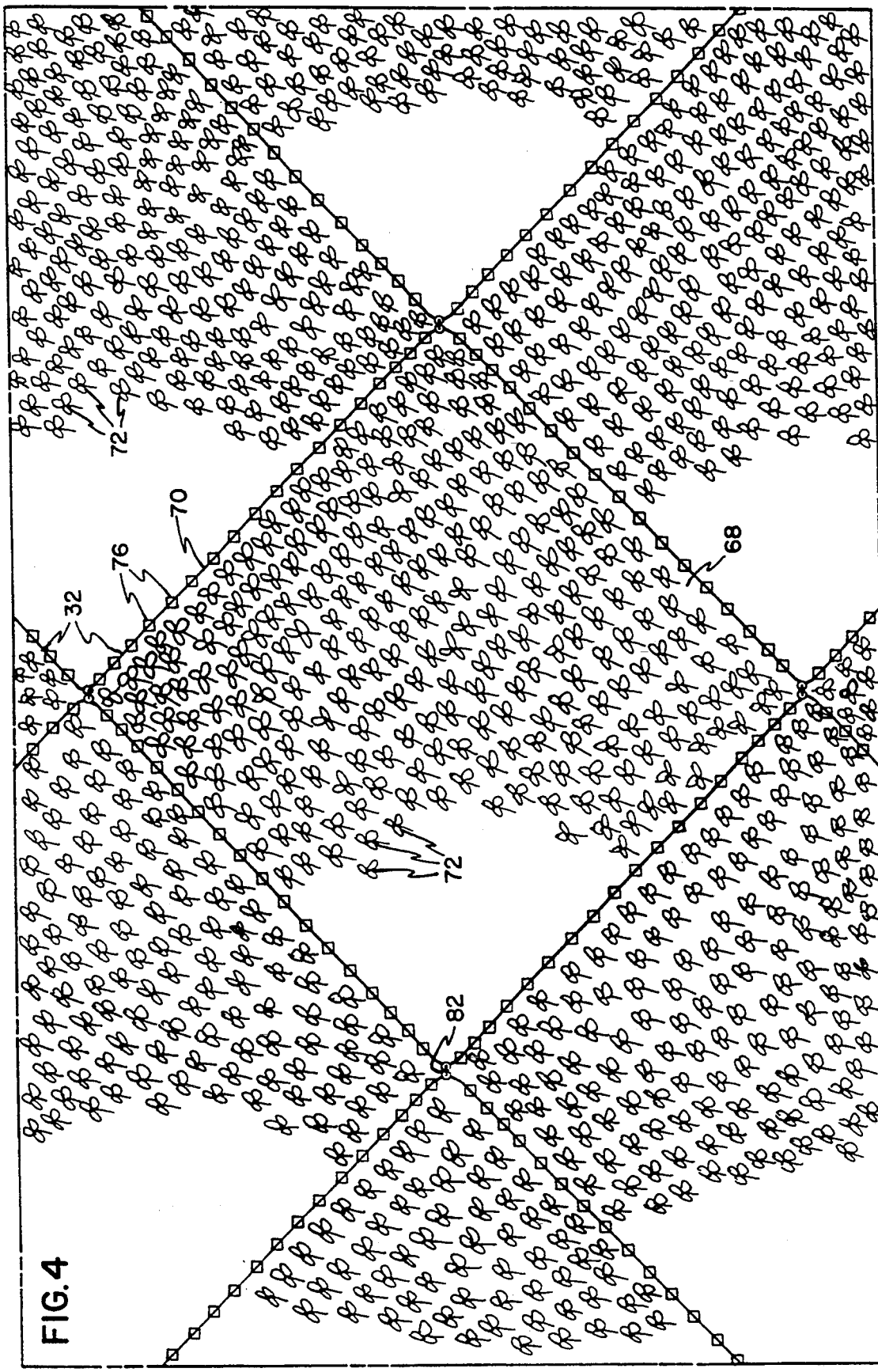
FIG. 4 shows a portion of the grid system shown in FIG. 1 in a deployed position with floating aquatic plants covering a portion of the surface.

As shown in FIG. 4, individual grid segments 70 which make up the grid structure 32 are connected to preferably form a substantially square containment zone 68. The containment zone 68 eliminates wave action to provide for even distribution of the Lemna plants 72.

In the preferred embodiment, the portion of the grid structure 32 which will be above the water surface will be such that it exceeds the maximum achievable wave height which is described by the formula:

$$\text{Max Wave Height} = 0.105 \times (\text{Maximum Fetch})^{\frac{1}{2}}$$

Fetch is the linear measure of space that the wind may blow over to create waves.

The grid segments 70 as shown in FIG. 5 include flotation chambers 76 which provide buoyancy such that the grid structure 32 floats in the water at a depth such that the plants are contained by the grid segments 70 under maximum fetch. In a preferred embodiment, the flotation chambers 76 are distributed symmetrically along a longitudinal axis of the grid segment 70. In a preferred embodiment, the shape of the flotation chambers 76 has a substantially V-shaped cross-section below the waterline for increased stability as shown in FIG. 6, however, it can be appreciated that any number of shapes may be used wherein the grid segments 70 may be folded. The grid segment 70 includes meshing end finger portions 78 as shown in FIGS. 7 and 10. The finger portions 78 interlock with adjacent finger portions 78 of another grid segment 70. For connection, a hollow connecting tube 80 is placed through the meshing finger portions 78 of the adjacent grid segments 70 so that the segments 70 are connected as shown in FIG. 9. Three grid segments 70 are connected in this fashion as shown in FIG. 9 to form a Z-fold 84.

A number of grid segments 70 may be connected to form a Z-fold bundle 88 as shown in FIG. 13. The length of the grid segments 70 as compared to the width is very great, for example in a Z-fold bundle 88, an average width of a folded segment 70 is 4 cm, while a typical length may be 3 meters. The Z-fold bundles 88 are then connected at the hinge through tube 80 to adjacent Z-fold bundles 88 by means of a U-bolt 82 as shown in FIG. 12. The U-bolt is inserted into the hollow connecting tubes 80 as shown in FIG. 11 to form connections at the hinges between the adjacent Z-fold bundles 88. In this manner adjacent Z-fold bundles 88 are connected as shown in FIG. 13. The flotation chambers 76 are spaced such that when adjacent grid segments 70 are connected and folded back upon one another, the flotation chambers 76 do not contact the flotation chambers 76 on the adjacent grid segment 70, as shown in FIG. 9. In this manner, the Z-fold bundles 88 are stored and transported in a much smaller space. For convenience and safety, the Z-fold bundles 88 are strapped together in a tight bundle during storage and shipping.

When the Z-fold bundles 88 have been connected with the U-bolts 82 as shown in FIG. 13, the connections allow the Z-fold bundles 88 to be stretched out toward shore as shown by the arrows, to form containment zones 68 as shown in FIG. 4. The grid segments 70 are reversible so that replacement of damaged segments 70 is easily accomplished by interchanging another identical grid segment 70. It can also be appreciated that should an exposed portion of the grid segment 70 become damaged, it is possible for the grid segment 70 to be flipped over, thereby avoiding replacement.

Figure 14:
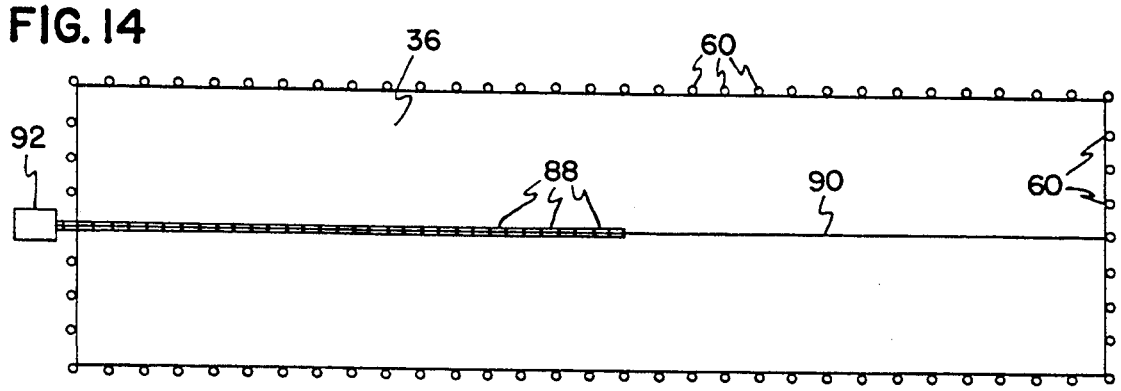
FIG. 14 shows a method of deploying the grid system shown in FIG. 1, wherein the Z-fold bundles are towed across the water surface.
Figure 15:
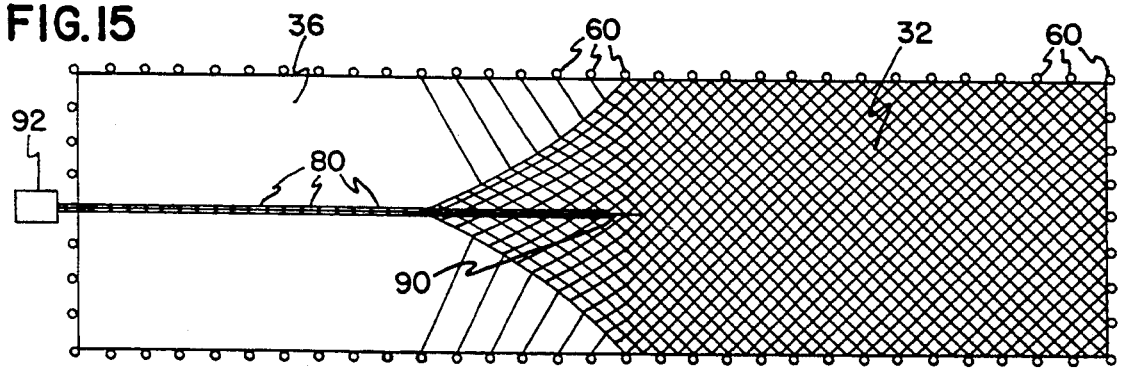
FIG. 15 shows the grid system being deployed wherein a portion of the grid structure is deployed.
Figure 16:
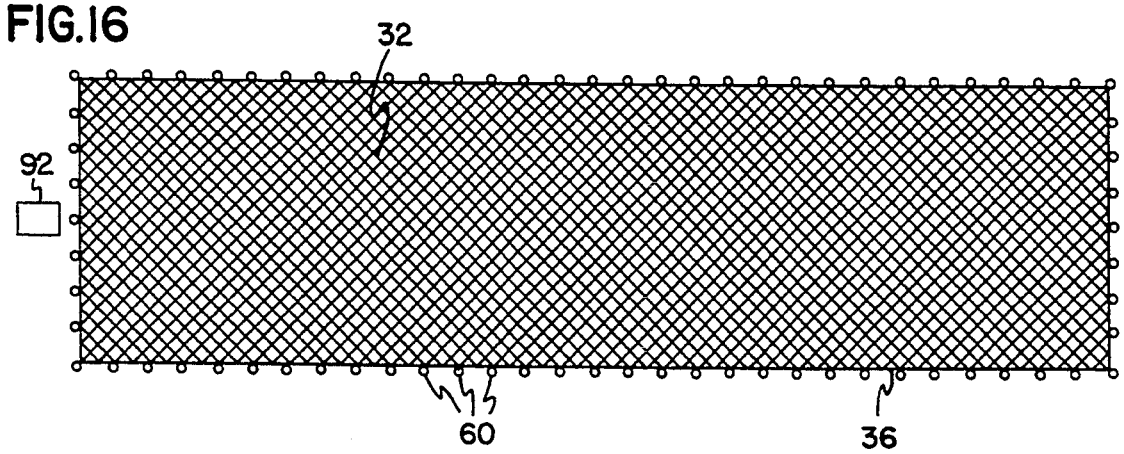
FIG. 16 shows the water area of FIG. 14 with the grid system substantially deployed.

The unique connections and assembly of the grid structure 32 allows easy deployment as shown in FIGS. 14–16. As shown in FIG. 14, the Z-fold bundles 88 are taken directly off a truck or trailer 92 parked on shore. The Z-fold bundles 88 are preferably preassembled and are then attached to the adjacent Z-fold bundles 88 and connected to a cable 90. As the Z-fold bundles 88 are towed across the length of the body of water, as shown in FIG. 15, the Z-fold bundles 88 are gradually unstrapped and stretched out across the width of the body of water to a deployed position. When fully stretched out, the ends of the grid 32 are attached to the shore at previously installed anchors 60. The process is continued down the length of the body of water until the grid 32 is fully deployed as shown in FIG. 16.

It can be appreciated that this method of deployment provides an easy method of assembling the grid structure 32 and provides for substantial preassembly of the Z-fold bundles 88. The unique structure of the Z-fold bundles 88 allows them to be folded so that a small space is occupied and the bundles 88 may be transported at a lower cost. The method provides for deploying the segments 70 over the entire length of the water, while avoiding difficult on-water construction.

Sprayer System

In conjunction with a floating aquatic plant wastewater treatment system, sprayers are used for improved control of growth conditions. A spray system helps to control temperatures and keeps the plants clean of dust and debris. Fertilizers may be injected into the sprayed water so that the floating aquatic plants have sufficient nutrients for growth. An advantage in spraying is achieved as nutrients are applied only at the water's surface where they are needed, instead of diluting with the flow of the water.

Figure 18:
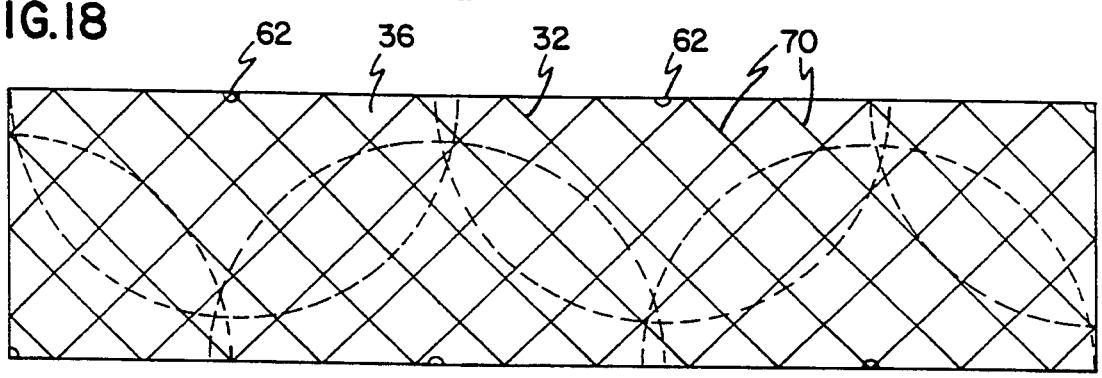
FIG. 18 shows a sprayer pattern wherein sprayers are mounted on berms.

According to the present invention, the sprayers are mounted in a variety of configurations so that the water surface is covered with the spray pattern. In a first embodiment, sprayers 62 are mounted on the berms 34 as shown in FIG. 3. A standard sprayer 62 provides a spray pattern such as that shown in FIG. 18. The configuration of the berms 34 provides access to the majority of the surface area of water channel 36 so that additional sprayers are not required.

Figure 17:
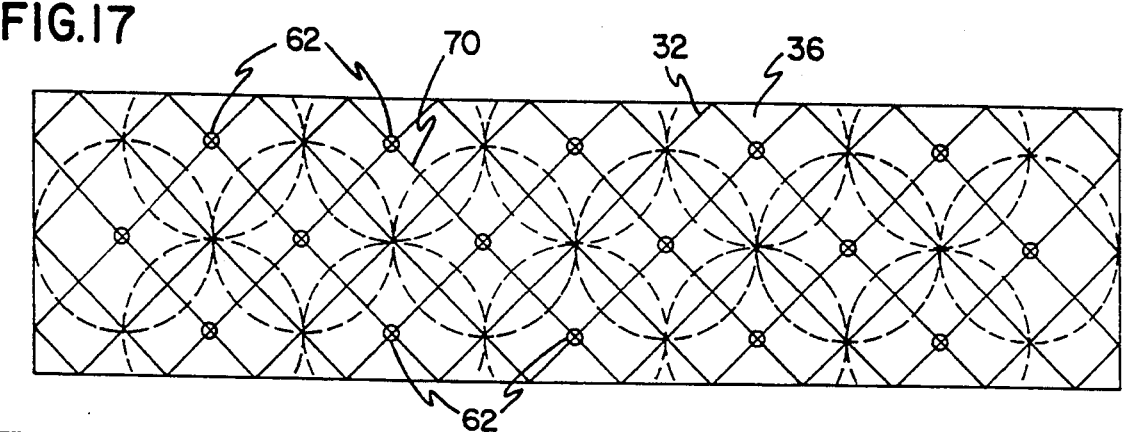
FIG. 17 shows a spray pattern wherein sprayers are mounted on the grid structure;.

In a second embodiment, the sprayers 62 are mounted on brackets 124, shown in FIG. 27, and mounted directly to the grid system 32 to form a spray pattern as shown in FIG. 17. The brackets 124 are clipped directly to the floating grid 32 at the U-bolt connection 82 and may be fed by a pump on shore.

Figure 19:
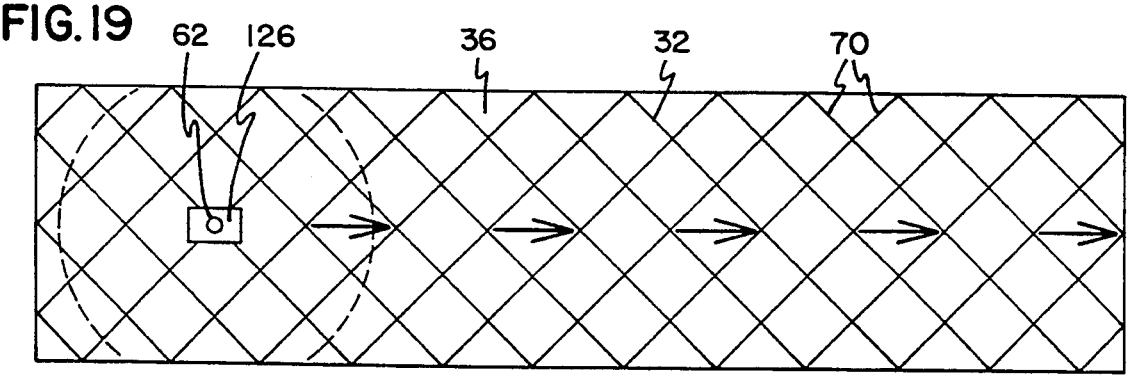
FIG. 19 shows a spray pattern wherein a sprayer is mounted on a barge or harvester and sprays in a 360° pattern.
Figure 20:
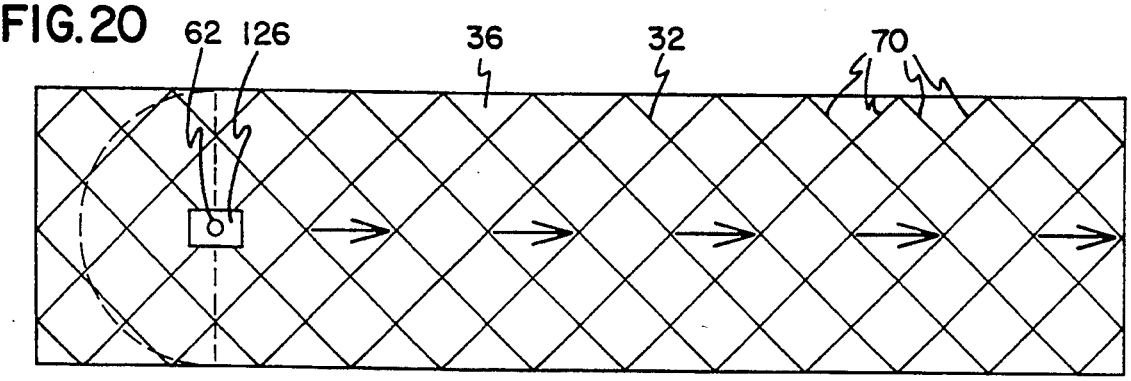
FIG. 20 shows a spray pattern wherein a sprayer is mounted on a barge or harvester and sprays a pattern in an arc of 180°.

In another method of spraying, the sprayers 62 may be mounted on a watercraft 126, such as a barge or harvester, as shown in FIGS. 28 and 29. The sprayer 62 may have a 360° spray pattern as shown in FIG. 19, the spray pattern may spray over an angle of 180° as shown in FIG. 20. In this manner, the entire surface is sprayed as the watercraft 126 moves along the channel 36. The watercraft 126 may intake water through an inlet 128, as shown in FIG. 29, as long as there is a proper screening 130 to prevent intake of unwanted debris. As shown in FIG. 28, the watercraft 126 includes fins 132 to direct the Lemna plants 72 away from the inlet 128.

Other spray patterns are possible wherein a combination of berm mounted, grid mounted, and watercraft mounted sprayers are combined. For example, sprayers may be used to clean the plant's surface and control temperatures with a grid mounted sprayer system and nutrients may be intermittently added when required through a watercraft mounted system.

Porous Baffle

Figure 21:
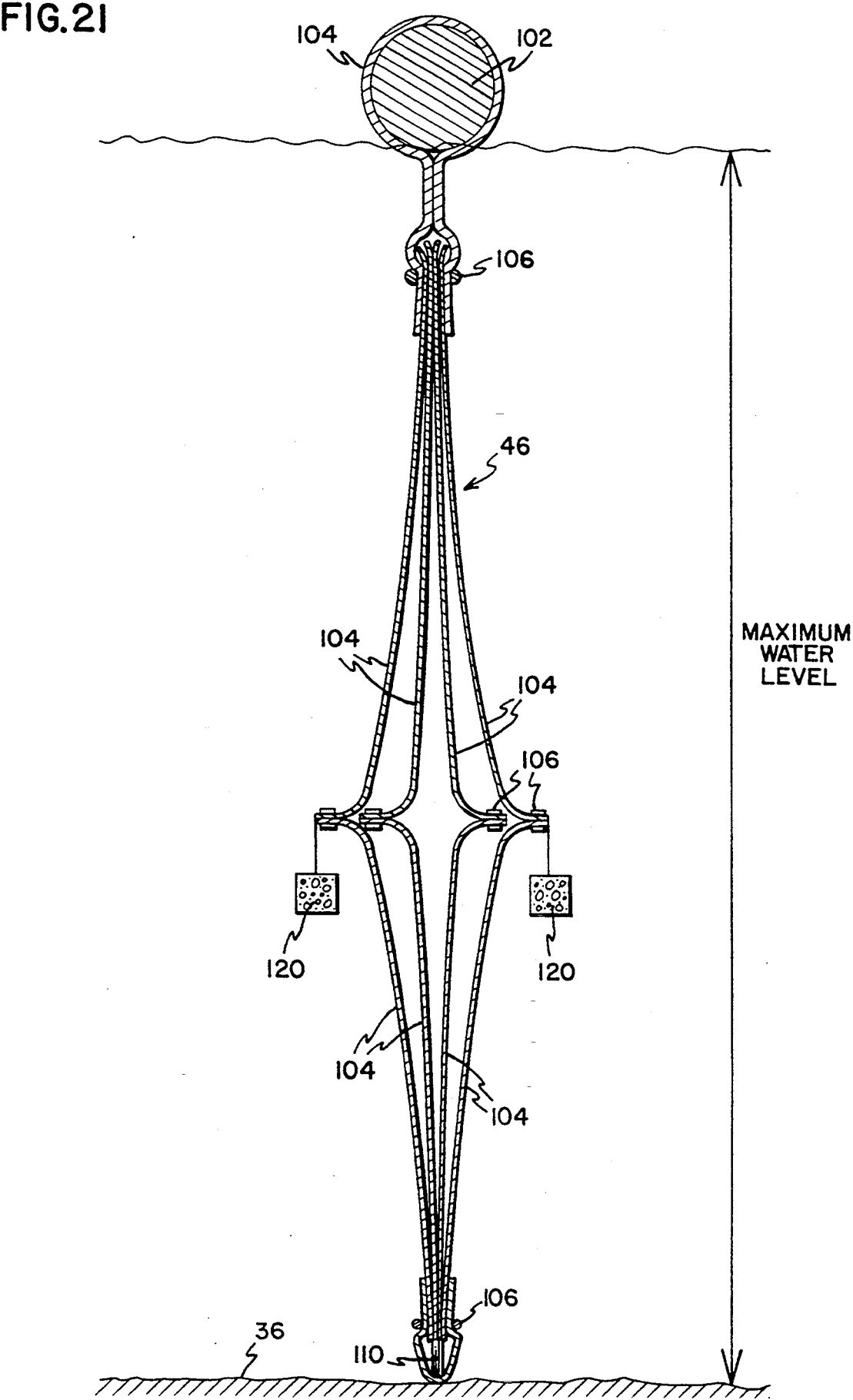
FIG. 21 is a cross-sectional end view of a preferred embodiment of a baffle.

As shown in FIG. 3, a porous baffle 46 is deployed which extends substantially across the width of the channel 36 and is attached by a cable 66 to anchors 60 on the berms 34. The porous baffle 46 includes a top float 102 extending substantially along the top edge of the baffle 46. Sheets of porous material 104 are supported by the top float 102 and extend substantially to the bottom of the channel 36. As shown in FIG. 21, the porous baffle 46 preferably includes a weighted chain 110 at the bottom of the baffle 46 for insuring that the porous baffle sheets 104 extend fully to the bottom of the channel 36. The porous baffle 46 preferably uses a number of sheets of porous material 104 so that flowing water is more evenly distributed across the entire channel to force an intimate contact with the entire surface of the baffle fibers 122 as shown in FIG. 26. Two or more sheets of baffle material 104 can be connected at an intermediate portion by rivets 106 as shown in FIG. 21.

As shown in FIG. 26, the material 104 is a loosely packed fibrous material. The fibers 122 provide a large surface area so that flora and other organisms may attach to the fibers 122 and have a greater chance of contacting the pollutants in the water. In a preferred embodiment the porous material 104 provides a surface area at least seven times the surface area of the square section of the material 104.

Figure 22:
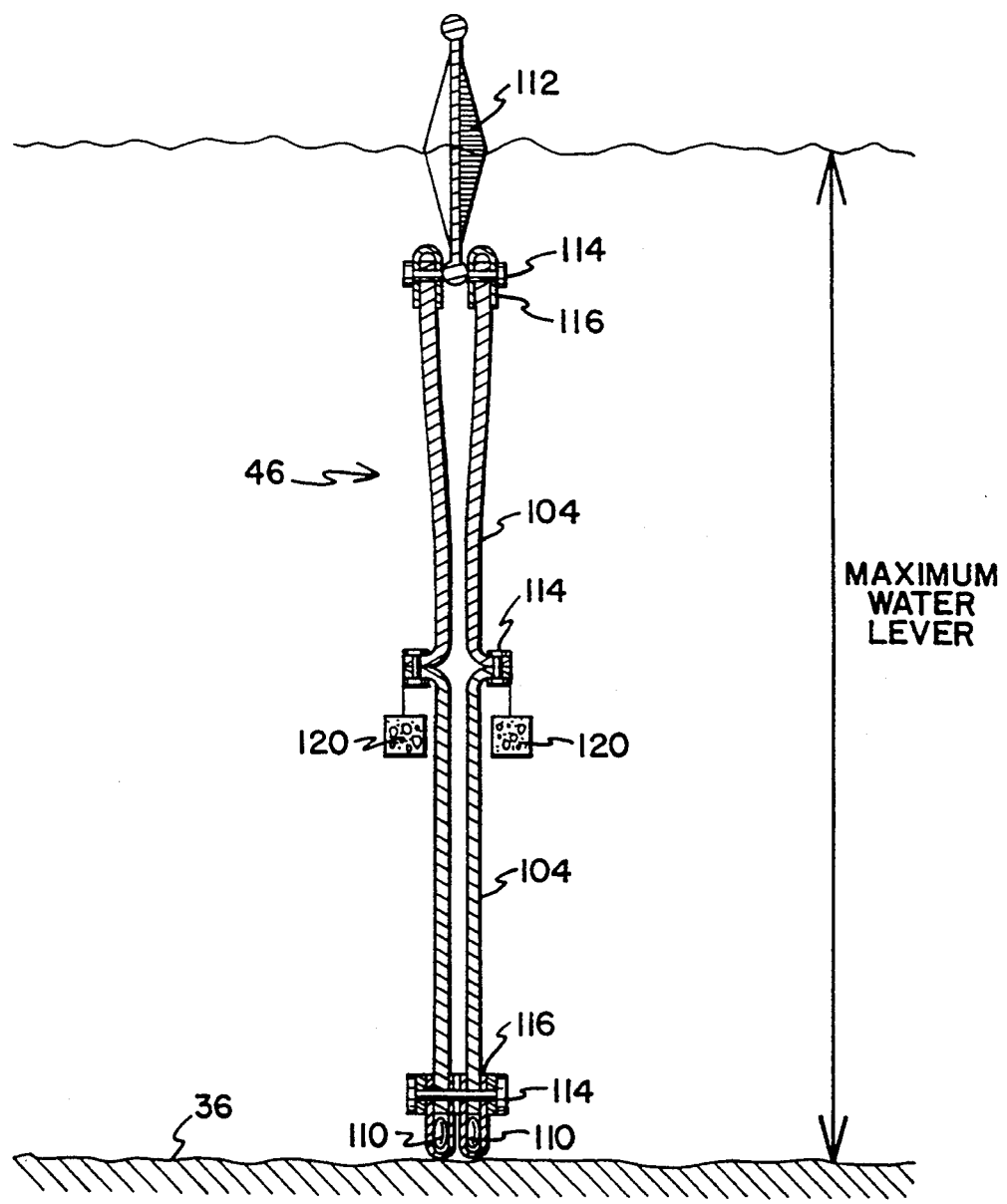
FIG. 22 is an end view of an alternate embodiment of a baffle.

In an alternative embodiment shown in FIG. 22, a top float 112 similar to a grid segment 70 is used instead of the float 102 shown in FIG. 21. The alternate embodiment further includes bolts 114 and reinforcing plates 116 for connecting adjacent portions of the porous baffle sheets 104.

Figure 23:
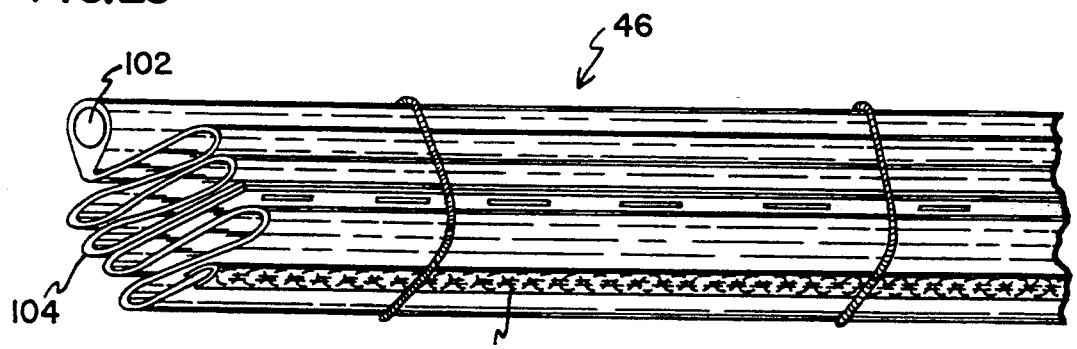
FIG. 23 is a view of the baffle shown in FIG. 21, wherein the baffle is bundled before deployment.

Baffle sections 46 are tied in bundles as shown in FIG. 23. When deployed, the baffles 46 are untied and the bottom ballast 110 drops the baffle 46 to the bottom of the channel 36.

Figure 24:
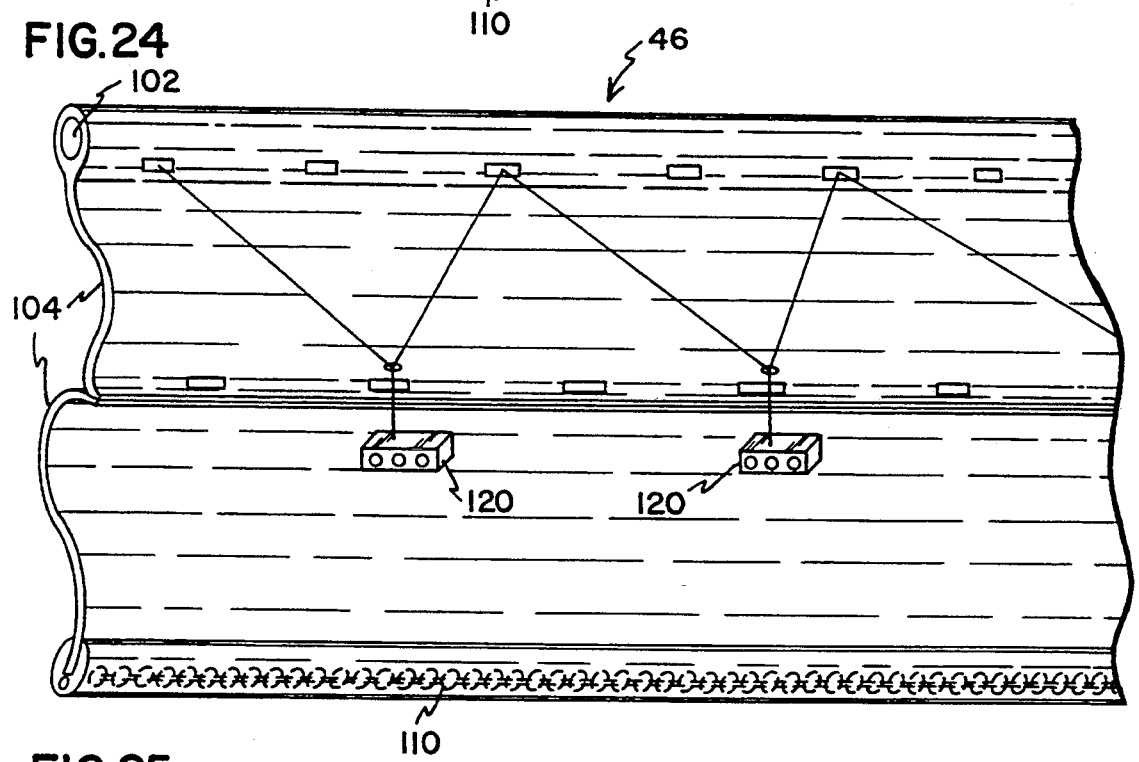
FIG. 24 shows the baffle of FIG. 21 deployed in a depth wherein the bottom edge is substantially fully extended.
Figure 25:
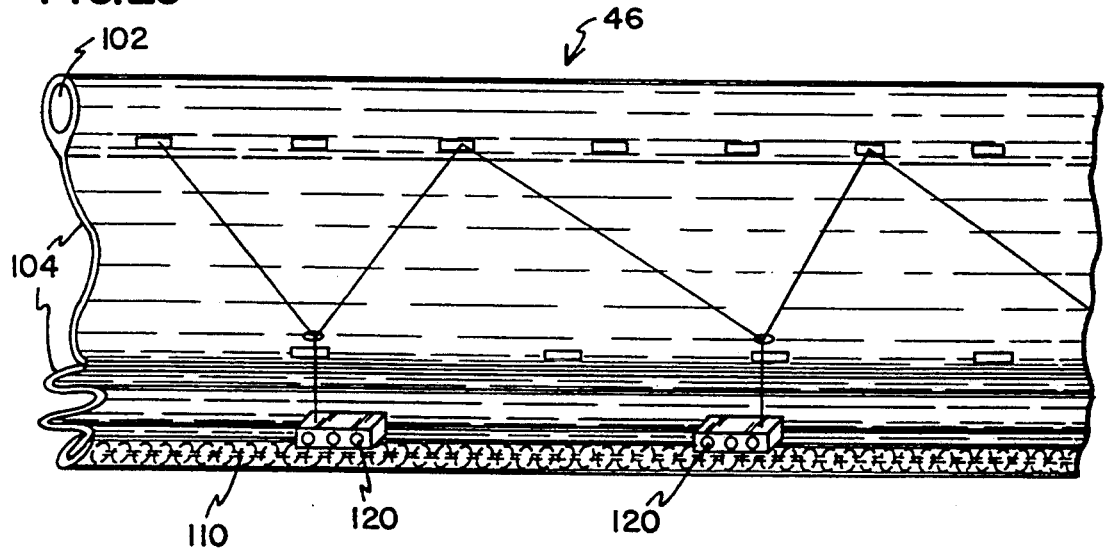
FIG. 25 shows a baffle of FIG. 21 in low water conditions wherein the baffle uses ballast mounted at a middle distance for extending to the bottom.

As shown in FIG. 24, when fully deployed, the baffle 46 further includes a ballast 120 at an intermediate position between the top float 102 and the bottom chain 110. The middle ballast 120 serves to keep the porous baffle vertical at low water levels, as shown in FIG. 25.

The porous baffles 46 are installed in conditions that are predominantly anaerobic, induced by the mat of floating aquatic plants 72 and the grid 32. This prevents thick aerobic slimes from building up on the porous baffles 46 and maintains the open structure to allow intimate contact of the wastewater with the thin anaerobic microbial slime on the fibers 122. In most ponds, the majority of the organisms which treat the water are at the bottom of the pond so that very little of the water comes into contact with the microorganisms. With the porous baffle 46, the water flows through the sheets of baffle material 104 and greatly improves the opportunity for contact with the microorganisms, yet prevents clogging resulting from heavy slime buildup. As shown in FIG. 26, the baffle fibers 122 allow free flow through the porous baffle 46 and provide a large surface area for the microorganisms to colonize.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A wastewater treatment system baffle, the system having a channel through which wastewater flows, the baffle comprising:

flotation means along a top edge portion of the baffle to maintain the top edge portion of the baffle along the surface of the wastewater;

porous baffle material extending substantially across the entire channel; and ballast means for maintaining a bottom edge portion of the baffle at substantially the bottom of the channel.

2. An apparatus according to claim 1, wherein the ballast means comprises:

weighted means, extending along the bottom edge portion of the baffle, for holding the bottom edge portion of the baffle at the bottom of the channel.

3. An apparatus according to claim 2, wherein the ballast means further comprises:

weights attached to the porous baffle material intermediate of the bottom edge portion and the top edge portion.

4. An apparatus according to claim 1, wherein the porous baffle material comprises:

porous material having a porosity such that the surface area of the porous baffle material is at lest seven times the surface area of a square section of the material.

5. An apparatus according to claim 1, wherein the baffle material is portless and allows the wastewater to pass evenly through the entire cross section.

6. A system for controlling the chemical conditions in a wastewater treatment system, comprising:

a porous baffle providing even flow of wastewater across the entire surface of the baffle, the baffle defining sites for flora and sites for chemical precipitation;

surface plant cover means, deployed on the surface of the wastewater, for absorbing chemical wastes from the wastewater and providing anaerobic conditions in the wastewater; and harvesting means for removing a portion of the surface plant cover means and for agitating the baffle so as to prevent plugging of the baffle.

7. A wastewater treatment system using floating aquatic plants, the system comprising:

a wastewater containment area having an inlet and an outlet;

a floating grid structure for defining areas for growth of the floating aquatic plants;

a plurality of spaced porous baffles extending transversely of wastewater flow from the inlet to the outlet, each baffle extending from a top surface of the wastewater downward to a bottom surface of the wastewater containment area.

8. The system of claim 7 wherein the baffles subdivide the wastewater containment area into a plurality of zones, and wherein the floating grid structure defines a plurality of areas for growth of the floating aquatic plants within each of the zones.

9. The system of claim 8 wherein each baffle comprises:

flotation means for maintaining a top portion of the baffle along the top surface of the wastewater;

porous baffle material extending downward from the flotation means; and ballast means for maintaining a bottom edge portion of the baffle adjacent the bottom of the wastewater treatment area.

* * * * *

UNITED STATES PATENT AND TRADEMARK OFFICE
CERTIFICATE OF CORRECTION

PATENT NO. : 5,342,512

DATED : August 30, 1994

INVENTOR(S) : VIET H. NGO, WARREN D. POOLE, SEAN J. HANCOCK, TIMOTHY T. FRANCE

It is certified that error appears in the above-indentified patent and that said Letters Patent is hereby corrected as shown below:

Col. 1, immediately below the Title of the Patent, insert --This is a continuation of application Serial No. 07/718,184 filed on June 20, 1991, abandoned as of the date of this application--

Col. 4, line 44, delete "hows", insert --shows--

Col. 9, line 9, delete "water - while", insert --water while--

Col. 12, delete lines 1-4, insert --ditions in the wastewater; and
    harvesting means for removing a portion of the surface plant
        cover means and for agitating the baffle so as to prevent
        plugging of the baffle.

Signed and Sealed this

Twenty-fourth Day of January, 1995

*Attest:*

BRUCE LEHMAN

*Attesting Officer*      *Commissioner of Patents and Trademarks*